US012723984B2

(12) United States Patent
Ji et al.

(10) Patent No.: US 12,723,984 B2
(45) Date of Patent: Sep. 1, 2026

(54) REAL-TIME FLUORESCENCE MONITORING SYSTEM FOR CRYO-FOCUSED ION BEAM MILLING DEVICE AND METHOD

(71) Applicant: Institute of Biophysics, Chinese Academy of Sciences, Beijing (CN)

(72) Inventors: Gang Ji, Beijing (CN); Shuoguo Li, Beijing (CN); Fei Sun, Beijing (CN)

(73) Assignee: Institute of Biophysics, Chinese Academy of Sciences, Beijing (CN)

( * ) Notice: Subject to any disclaimer, the term of this patent is extended or adjusted under 35 U.S.C. 154(b) by 303 days.

(21) Appl. No.: 18/437,697

(22) Filed: Feb. 9, 2024

(65) Prior Publication Data

US 2024/0288370 A1 Aug. 29, 2024

Related U.S. Application Data

(63) Continuation of application No. PCT/CN2022/087612, filed on Apr. 19, 2022.

(30) Foreign Application Priority Data

Aug. 11, 2021 (CN) ......................... 202110920369.4
Aug. 11, 2021 (CN) ......................... 202121877669.0

(51) Int. Cl.
*G01N 21/64* (2006.01)

(52) U.S. Cl.
CPC ................................ *G01N 21/6458* (2013.01)

(58) Field of Classification Search
CPC .... G01N 21/6458; G01N 23/04; G01N 21/64; G01N 23/223
See application file for complete search history.

(56) References Cited

U.S. PATENT DOCUMENTS

2005/0056784 A1* 3/2005 Subramaniam ......... H01J 37/22 250/311
2014/0072104 A1* 3/2014 Jacobsen .................. G21K 7/00 378/62

(Continued)

FOREIGN PATENT DOCUMENTS

AU 2013241684 A1 * 10/2013 ......... G01N 21/6452
CN 103308496 A 9/2013

(Continued)

OTHER PUBLICATIONS

First Office Action issued in counterpart Chinese Patent Application No. 202110920369.4, dated Dec. 27, 2024.

(Continued)

*Primary Examiner* — Andrew W Bee
*Assistant Examiner* — D J Dhooge
(74) *Attorney, Agent, or Firm* — Westbridge IP LLC

(57) ABSTRACT

Disclosed are a real-time fluorescence monitoring cryo-focused ion beam processing device and a corresponding method. The device includes a vacuum chamber, an ion beam system, and a fluorescence imaging system. A cryo stage is provided in the vacuum chamber and is used for placing a frozen sample, in which a fluorescent marker is provided. The ion beam system is disposed on the vacuum chamber and directed to the frozen sample for ion beam processing the frozen sample. The fluorescence imaging system is arranged on the vacuum chamber and located below the frozen sample and is used for performing real-time optical imaging on the frozen sample. During processing, the fluorescence imaging system emits excitation light to the frozen sample to excite the fluorescent marker in the sample to emit fluorescence, which is received by the fluorescence imaging system to form an image of a target structure in the frozen sample.

10 Claims, 10 Drawing Sheets

(56) References Cited

U.S. PATENT DOCUMENTS

| | | | | |
|---|---|---|---|---|
| 2015/0160114 | A1* | 6/2015 | Shin | G01N 1/42 435/5 |
| 2019/0108971 | A1 | 4/2019 | Vaske et al. | |
| 2022/0301810 | A1* | 9/2022 | Mahamid | H01J 37/20 |
| 2024/0201088 | A1* | 6/2024 | Ghorbani | G01N 21/6458 |

FOREIGN PATENT DOCUMENTS

| | | | |
|---|---|---|---|
| CN | 110108690 | A | 8/2019 |
| CN | 112914517 | A | 6/2021 |
| CN | 113670964 | A | 11/2021 |
| CN | 216144726 | U | 3/2022 |
| JP | 2018152365 | A | 9/2018 |
| JP | 2018200815 | A | 12/2018 |
| JP | 2020129547 | A | 8/2020 |
| WO | 2020190136 | A1 | 9/2020 |

OTHER PUBLICATIONS

Bieber et al., Precise 3D-correlative FIB-milling of biological samples using METEOR, an integrated cryo-CLEM imaging system, Microscopy Society of America, 2021, 27(S1), pp. 3230-3232, dated Jul. 30, 2021.

Gorelick et al., PIE-scope, integrated cryo-correlative light and FIB/SEM microscopy, Tools and Resources, 2019, 22(4), pp. 1-15, dated Jul. 1, 2019.

International Search Report and Written Opinion issued in corresponding PCT Application No. PCT/CN2022/087612, dated Jun. 28, 2022.

Refusal Decision issued in counterpart Chinese Patent Application No. 202110920369.4, dated Sep. 15, 2025.

Second Office Action issued in counterpart Chinese Patent Application No. 202110920369.4, dated Apr. 19, 2025.

Third Office Action issued in counterpart Chinese Patent Application No. 202110920369.4, dated Jul. 3, 2025.

* cited by examiner

REAL-TIME FLUORESCENCE MONITORING SYSTEM FOR CRYO-FOCUSED ION BEAM MILLING DEVICE AND METHOD

CROSS-REFERENCE TO RELATED APPLICATIONS

This application is a national phase application of PCT International Application PCT/CN2022/087612, filed on Apr. 19, 2022, which claims priority to Chinese Patent Application No. 202110920369.4, filed on Aug. 11, 2021, and Chinese Patent Application No. 202121877669.0, filed on Aug. 11, 2021. All of the aforementioned applications are incorporated herein by reference in their entireties.

TECHNICAL FIELD

The present application relates to the technical field of microscopic imaging, and in particular to a real-time fluorescence monitoring cryo-focused ion beam processing device and a a real-time fluorescence monitoring cryo-focused ion beam processing method.

BACKGROUND

In cryo-electron microscopy technology, a biological sample can be frozen in a near-physiological state through rapid freezing or high-pressure freezing technology, and a high-resolution structure can be preserved. Electron tomography is an important means of the cryo-electron microscope, based on which a high-resolution three-dimensional structure of the biological sample can be obtained by rotating and imaging the frozen sample and three-dimensional reconstructing the frozen sample. Since a sample only with a thickness of tens to hundreds of nanometers can be observed by the transmission electron microscope imaging technology, it is impossible to directly observe the sample with a thickness of several microns or even more, so the sample need to be cross sectioned. There are mainly two kinds of techniques for cross sectioning the frozen biological sample. One is to cross section the sample with a cryo-ultramicrotome, which needs to cross section the sample with a diamond cutter, and a lamellae after the cross sectioning may have a thickness of about 100 nm. However, this technology is hard to be popularized due to its difficulty, and wrinkle deformation, ice crystal pollution and other problems may occur during the cross sectioning, and also success rate of the experiment is very low. The other one is to cross section the sample by the cryo-focused ion beam technology, and to process the sample by using the high-energy ion beam focused to a diameter of about several nanometers, so as to obtain a biological lamellae with a very flat cross-sectional surface and a thickness of about 200 nm. The lamellae obtained by this technology is of high quality, so it has become a very important technology for the biological sample lamellae preparation.

In the operation of cryo-focused ion beam technology, accurate positioning and processing of the frozen sample is a very important technical procedure. Cryo dual-beam scanning electron microscope (SEM) is a sample processing equipment, while a cell structure that needs accurate positioning is usually inside the cell. Cryo dual-beam scanning electron microscope, which can only observe the surface morphology of the sample, cannot observe and capture the intracellular structure. In order to solve this problem, the common technical solution at present is to label the target structure to be observed in advance, pre-position it by fluorescence imaging, and then process it by cryo-focused ion beam under a guide of the fluorescence positioning. There are generally two methods of the fluorescence imaging and positioning. In the first method, the fluorescence imaging device and the cryo-focused ion beam device are two independent equipment. The frozen biological sample labeled with fluorescence dyes in advance needs to be transferred to the fluorescence imaging device to complete the cryo-fluorescence imaging, then transferred to the cryo-focused ion beam device to obtain a scanning electron microscope image, and then the fluorescence image and the scanning electron microscope image are properly aligned by associated software to obtain the positioning information of the fluorescence labeled target in the cell, so as to guide the focused ion beam to carry out the cross sectioning on the target position. The second method is to integrate a fluorescence microscope in the cryo-dual-beam scanning electron microscope chamber, and the objective lens of the fluorescence microscope and the ion gun of the scanning electron microscope ion beam system are arranged side by side on a same side of a sample stage, so as to realize the integration of the two imaging technologies in hardware. In this integrated optical microscope-electron microscope imaging system, the frozen sample needs to be transferred repeatedly between the fluorescent objective lens and the ion gun with the sample stage. Firstly, the sample is transferred to the fluorescence microscope to obtain the fluorescence positioning. Secondly, the sample is transferred to the ion beam system to be cross sectioned by the ion beam, and a thick lamellae is got after roughly milling. The sample then is transferred to the fluorescent microscope again to be observed whether the fluorescent signal on the lamellae is present. After the fluorescent positioning is realized, the sample is transferred to the ion beam system to get the cross sectioning for the target region. The steps described above will be repeated until the lamellae with the thickness of 200 nm is obtained.

The above two methods have their own advantages and disadvantages. In the first method, since the fluorescence microscope and the cryo dual-beam scanning electron microscope are separated and will not affect each other, the two equipment can perform imaging separately and have high throughput. However, due to only one alignment in this technical process, the accuracy of correlation alignment is relatively poor, and the success rate of capturing microstructures is low. In the second way, fluorescence in-situ imaging can be realized in the scanning electron microscope, and the position of fluorescence signal in the thick section can be repeatedly monitored through sample movement, thus the success rate of capturing small targets is greatly improved. However, during the whole processing, since the fluorescence imaging and the ion beam processing cannot be carried out at the same time, the sample needs to be moved back and forth or rotated, so the experimental time is long and inefficient, which is not conducive to high-throughput sample preparation, and the correlation localization accuracy is also limited. For the smaller targets, they are easy to be lost during the processing, which cannot meet the requirements of high-accuracy ion beam processing.

SUMMARY

In view of the above shortcomings and deficiencies of the conventional technology, an object of the present application is to provide a real-time fluorescence monitoring cryo-focused ion beam processing device and a method, which solve the problems of long processing procedure, low processing efficiency, poor positioning accuracy and low success rate in ion beam processing of the frozen sample in the conventional technology.

In order to achieve the above object, the present application provides a real-time fluorescence monitoring cryo-focused ion beam processing device and a real-time fluorescence monitoring cryo-focused ion beam processing method, and the specific technical solutions are as follows.

A real-time fluorescence monitoring cryo-focused ion beam processing device includes:

- a vacuum chamber, where the vacuum chamber is internally provided with a cryo stage for storing a frozen sample, and a fluorescent marker is arranged in the frozen sample;
- an ion beam system, where the ion beam system is arranged on the vacuum chamber and directed to the frozen sample, so as to perform an ion beam processing on the frozen sample; and
- a fluorescence imaging system, where the fluorescence imaging system is arranged on the vacuum chamber and below the frozen sample, so as to emit excitation light to the frozen sample and perform real-time optical imaging.

In an embodiment, the fluorescence imaging system includes a laser, an objective lens, a reflector, a barrel lens, a dichroic mirror, an optical filter and an image detector which are sequentially arranged along an optical path.

The vacuum chamber is provided with a fluorescence window, and a vacuum flange is hermetically connected to the fluorescence window.

One end of the vacuum flange is connected with an optical connection tube, and the other end of the vacuum flange is connected with a base, where the optical connection tube is located outside the vacuum chamber, and the base is located inside the vacuum chamber.

The objective lens and the reflector are both arranged on the base.

The barrel lens, the dichroic mirror and the optical filter are all arranged in the optical connection tube, and the image detector is arranged on a side, away from the vacuum flange, of the optical connection tube.

A light-transmitting piece is centrally arranged on the vacuum flange, and the light-transmitting piece is used for sealing the vacuum chamber.

The laser is arranged on a branch of a tube wall of the optical connection tube, and the laser is located on a side where the dichroic mirror is perpendicular to the optical filter.

In an embodiment, a linear translation stage is arranged on the base.

The objective lens and the reflector are both arranged on the linear translation stage, and the objective lens and the reflector may be driven by the linear translation stage to move towards and/or away from the frozen sample.

In an embodiment, the linear translation stage is further provided with an objective lens adjusting device and a reflector adjusting device.

The objective lens is arranged on the objective lens adjusting device, which is configured for driving the objective lens to move and/or rotate in three dimensions.

The reflector is arranged on the reflector adjusting device, which is configured for driving the reflector to move and/or rotate in a plane.

In an embodiment, the objective lens adjusting device includes an objective lens rotary stage and an objective translating stage.

The objective lens is arranged on the objective lens translation stage, the objective lens translation stage is arranged on the objective lens rotary stage, and the objective lens rotary stage is arranged on a linear translation stage, where the objective lens can be driven by the objective lens translation stage to move in three dimensions, and can be driven by the objective lens rotary stage to rotate.

In an embodiment, the reflector adjusting device includes a reflector translation stage and a reflector rotary stage.

The reflector is arranged on the reflector rotary stage, the reflector rotary stage is arranged on the reflector translation stage, and the reflector translation stage is arranged on the linear translation stage, where the reflector can be driven by the reflector rotary stage to rotate, and can be driven by the reflector translation stage to move in the plane.

In an embodiment, the vacuum chamber is further provided with an electron beam system for electron beam imaging the frozen sample.

The electron beam system is obliquely arranged relative to the ion beam system, and the electron beam emitted by the electron beam system and the ion beam emitted by the ion beam system can intersect at one point, and the frozen sample is located at the intersection point.

In an embodiment, the cryo stage is arranged on a position adjusting device, and the position adjusting device is configured for driving the cryo stage to perform position adjustment.

The position adjusting device includes:

- a first sample translation stage, on which the cryo stage is arranged;
- a second sample translation stage, which is arranged below the first sample translation stage;
- a sample lifting stage, which is arranged below the second sample translation stage; and
- a sample rotary stage, which is arranged on a vacuum chamber door and connected with the sample lifting stage through an L-shaped bracket, where the L-shaped bracket, the sample lifting stage, the second sample translation stage, the first sample translation stage and the cryo stage can be driven by the sample rotary stage to rotate synchronously.

In an embodiment, the cryo stage is an end of a cryo-transfer device. The cryo-transfer device includes:

- a sample transfer tube, where a side of the vacuum chamber door is provided with a sample transfer port, and the sample transfer tube is flexibly connected to the sample transfer port through a bellows assembly;
- a frozen sample transfer holder, one end of which is provided with a Dewar and other end of which is a frozen sample fixing end,
- where the frozen sample fixing end passes through the sample transfer tube, an outer periphery of the frozen sample fixing end is connected with an inner wall of the sample transfer tube in a dynamic sealing way, and the frozen sample fixing end can pass through the sample transfer port to transfer the frozen sample into the vacuum chamber; and
- an end where the Dewar is located can be clamped to and/or decoupled from the sample transfer tube; and
- a cryo transfer three-dimensional translation stage, which is connected with the sample transfer tube, and when the frozen sample transfer holder is clamped with the sample transfer tube, the frozen sample transfer holder clamped to the sample transfer tube can be driven by the cryo transfer three-dimensional translation stage to move in three dimensions.

In an embodiment, the cryo-transfer device further includes an angle adjusting device. The angle adjusting device includes:

a sleeve vacuum plate valve housing assembly, one end of which is hermetically connected to the cryo transfer port and the other end of which is hermetically connected to the bellows assembly, where one end of the bellows assembly is hermetically connected to the sample transfer tube and the other end of the bellows assembly is fixedly connected to a cryo transfer three-dimensional translation stage bracket;

a worm wheel, which is arranged on a shaft disc, where the shaft disc is rotatably sleeved on an outer periphery of the sleeve vacuum plate valve housing assembly, and the shaft disc is fixedly connected with the cryo transfer three-dimensional translation stage bracket;

a worm, an end of which is rotatably connected to a worm bracket, where the worm bracket is arranged on the vacuum chamber door, and one end of the worm is connected with a motor and engaged with the worm wheel;

where when the frozen sample transfer holder is clamped with the sample transfer tube, the motor can drive the worm wheel engaged with the worm to rotate, so as to drive the shaft disc, the cryo transfer three-dimensional translation stage, the sample transfer tube, the bellows assembly and the frozen sample transfer holder to rotate synchronously, so as to adjust the frozen sample between the electron beam system and/or the ion beam system.

A real-time fluorescence monitoring cryo-focused ion beam processing method includes the following steps:

transferring the frozen sample to the vacuum chamber and placing the frozen sample on the cryo-stage;

controlling the fluorescence imaging system to start, sending excitation light to the frozen sample and performing real-time imaging;

controlling the ion beam system to start, performing the ion beam processing on the frozen sample, and monitoring the processing of the frozen sample in real time through the fluorescence image system.

The real-time fluorescence monitoring cryo-focused ion beam processing device and the real-time fluorescence monitoring cryo-focused ion beam processing method provided by the present application have the following beneficial effects.

In the present application, the frozen sample is placed on a cryo stage, the fluorescent marker is labeled on the required structure in the frozen sample, and the frozen sample is subjected to the ion beam processing through the ion beam system under the guide of the fluorescent signal. During the processing, the excitation light is emitted to the frozen sample by the fluorescence imaging system, where the excitation light irradiates the frozen sample to excite the fluorescent marker in the frozen sample to emit fluorescence, and the fluorescence signal is received by the fluorescence imaging system to form an image. According to the present application, the frozen sample is imaged in real time, the change of the fluorescence image and the change of the fluorescence signal strength is obtained in real time, the structure of the frozen sample processed by the ion beam and the reserved structure is monitored in real time, and the further processing position of the ion beam is guided until the needed thin lamellae is obtained finally, so that the accurate processing of the frozen sample is realized under the guide of the in-situ real-time fluorescence, thereby improving the processing accuracy, shortening the processing procedure of the frozen sample and improving the processing efficiency and success rate.

BRIEF DESCRIPTION OF THE DRAWINGS

The drawings illustrated herein intend to provide a further understanding of the present application and constitute a part of the present application. The illustrative embodiments of the present application and their descriptions are used to explain the present application and will not constitute an improper limitation of the present application. In the drawings.

DETAILED DESCRIPTION OF THE EMBODIMENTS

Figure 1:
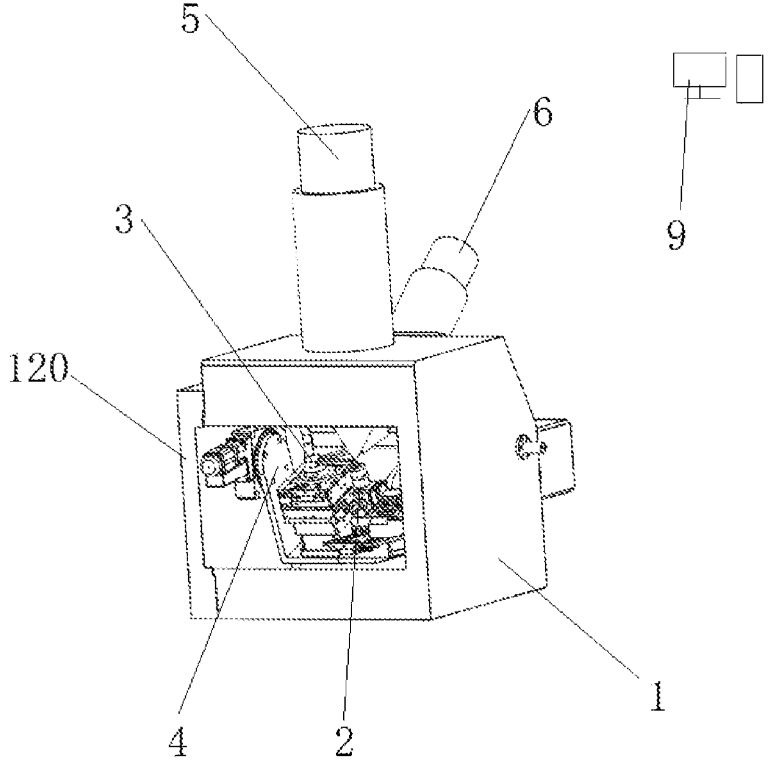
FIG. 1 is a schematic structural view of a real-time fluorescence monitoring cryo-focused ion beam processing device according to Example 1 in a specific embodiment.

In order to make the purpose, technical solutions and advantages of the present application more clear, the technical solutions in the embodiment of the present application will be described in more detail with reference to the drawings in the preferred embodiment of the present application. In the drawings, the same or similar reference numerals indicate the same or similar elements or elements with the same or similar functions throughout. The described embodiments are only some, rather than all, embodiments of the present application. The embodiments described below by referring to the drawings are exemplary and are intended to explain the present application, but not to be construed as limiting the present application. All other embodiments obtained by those skilled in the art without any creative efforts based on the embodiments of the present application fall within the protection scope of the present application. Embodiments of the present application will be described in detail with reference to the drawings.

In the description of this embodiment, it should be understood that the terms "center", "vertical", "lateral", "front", "back", "left", "right", "upright", "horizontal", "top", "bottom", "inside" and "outside" and the like indicate that the orientation or position relationship are based on the orientation or position relationship shown in the drawings, and are only for the convenience of describing this embodiment and simplifying the description, rather than indicating or implying that the device or component referred to must have a specific orientation, or must be constructed and operated in a specific orientation, and thus should not be understood as a limitation on the scope of protection of the present application.

Example 1

Referring to FIG. 1 to FIG. 4 and FIG. 11, a real-time fluorescence monitoring cryo-focused ion beam processing device is provided according to this example. The real-time fluorescence monitoring cryo-focused ion beam processing device includes a vacuum chamber 1, an ion beam system 6 and a fluorescence imaging system 2. The vacuum chamber 1 is provided with a cryo stage 3 for storing a frozen sample 8, and a fluorescent marker is arranged in the frozen sample 8. When excitation light is irradiated on the frozen sample 8, the fluorescent marker is excited to emit fluorescence. The ion beam system 6 is arranged on the vacuum chamber 1 and directed to the frozen sample 8, and is configured for emitting a focused ion beam to ion beam section the frozen sample 8. The fluorescence imaging system 2 is arranged on the vacuum chamber 1 and below the frozen sample 8, and is configured for emitting the excitation light to the frozen sample 8 and performing real-time optical imaging on the frozen sample 8. In specific operation, the fluorescence imaging system 2 emits the excitation light to the frozen sample 8, and the excitation light irradiates the frozen sample 8, so that the fluorescent marker in the frozen sample 8 is excited to emit fluorescence, and the fluorescence is received by the fluorescence imaging system 2 to form an image of a structure marked by the fluorescent marker in the frozen sample 8. When the frozen sample 8 is cross sectioned by the ion beam, the fluorescence imaging system 2 is used to monitor the processing situation of the frozen sample 8, enabling the in-situ ion beam processing on the frozen sample 8 under the real-time fluorescence monitoring without transferring the frozen sample 8, thereby greatly improving the processing accuracy of the frozen sample 8, simplifying the processing procedure, shortening the processing time and improving the processing efficiency.

Figure 2:
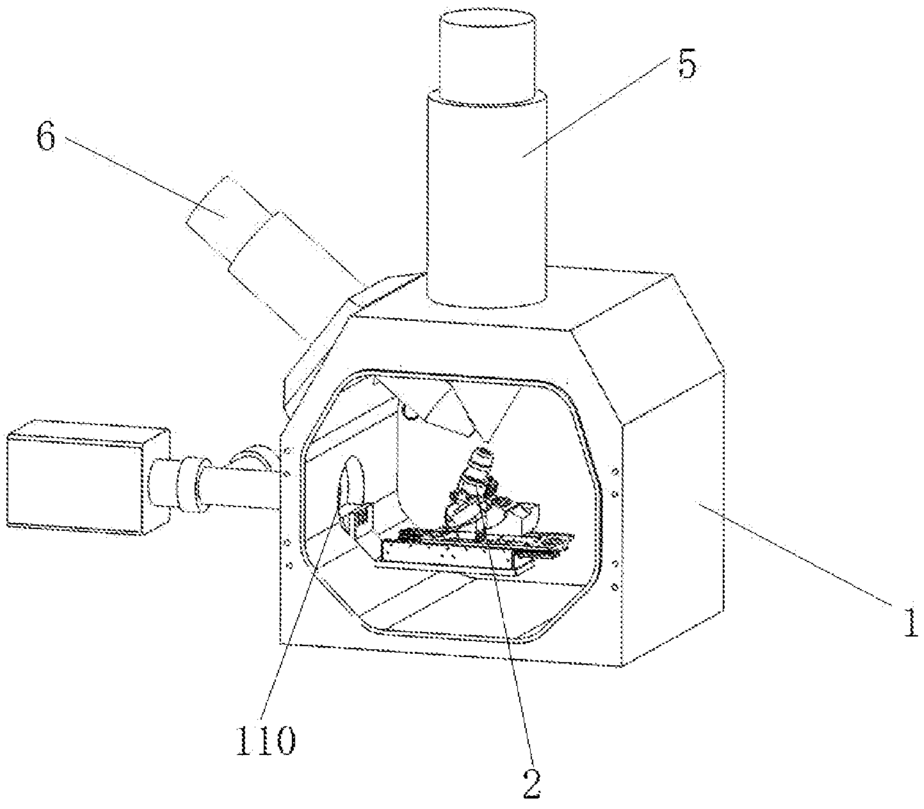
FIG. 2 is a schematic structural view of a fluorescence imaging system, a vacuum chamber, an ion beam system and an electron beam system according to Example 1 and Example 2 in a specific embodiment.
Figure 3:
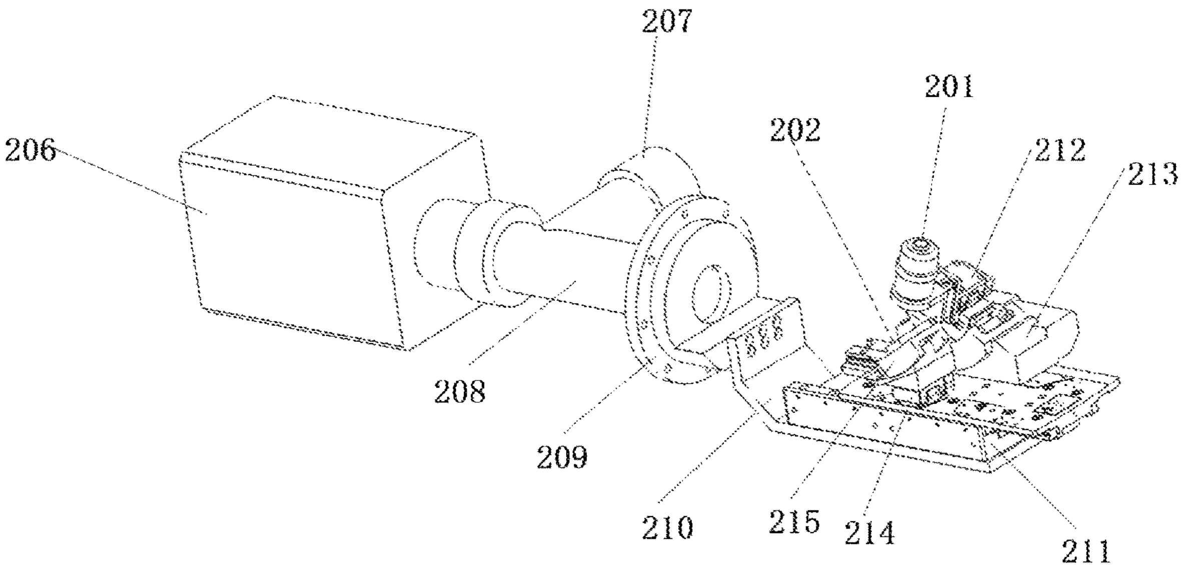
FIG. 3 is a schematic structural view of the fluorescence imaging system according to Example 1 and Example 2 in a specific embodiment.
Figure 11:
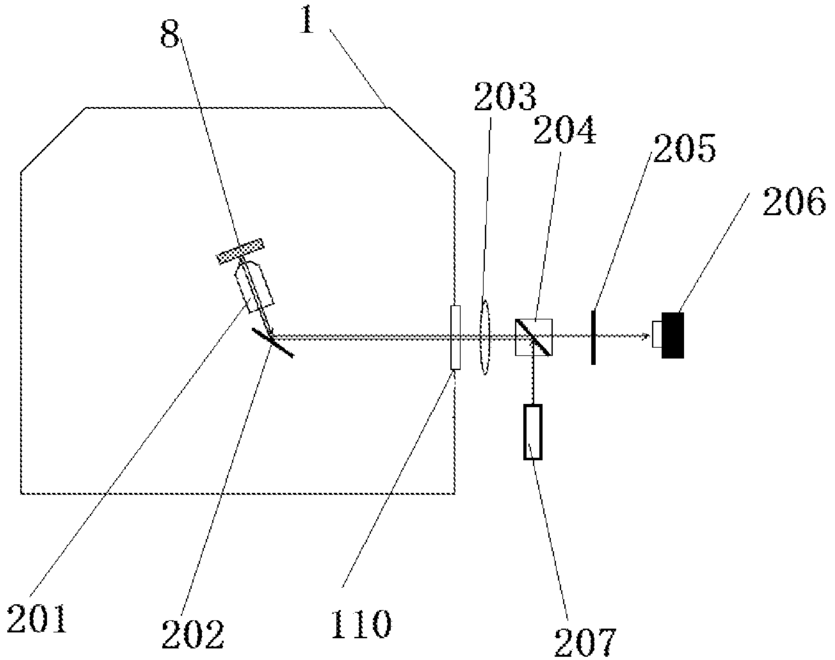
FIG. 11 is a schematic view showing an optical path of the fluorescence imaging system according to Example 1 and Example 2 in a specific embodiment.

Specifically, referring to FIG. 2, FIG. 3 and FIG. 11, the fluorescence imaging system 2 in this embodiment includes a laser 207, an objective lens 201, a reflector 202, a barrel lens 203, a dichroic mirror 204, a optical filter 205 and an image detector 206, which are sequentially arranged along an optical path. A side of the vacuum chamber 1 is provided with an optical window 110, and the optical window 110 is hermetically connected with a vacuum flange 209. A side of the vacuum flange 209 is connected with an optical connection tube 208, and other side of the vacuum flange 209 is connected with a base 210. Further, the objective lens 201 is arranged on an optical path of the fluorescence emitted by the fluorescent marker of the frozen sample 8 and below the frozen sample 8, and both the objective lens 201 and the reflector 202 are arranged on the base 210. The barrel lens 203, the dichroic mirror 204 and the optical filter 205 are sequentially arranged in the optical connection barrel 208 along the optical path, and the image detector 206 is arranged at a side, away from the vacuum flange 209, of the optical connection tube 208. A light-transmitting piece is centrally arranged on the vacuum flange 209, which seals the vacuum chamber 1 and can transmit the excitation light and fluorescence. A barrel wall branch of the optical connection barrel 208 is further provided with a laser 207. The laser 207 is located on a side of the dichroic mirror 204 perpendicular to the optical filter 205 and is configured for emitting the excitation light. The dichroic mirror 204 has reflection and transmission functions, and can reflect the excitation light (with short wavelength) and transmit the fluorescence light (with long wavelength). Specifically, in this example, the excitation light (with short wavelength) emitted by the laser 207 is reflected by the dichroic mirror 204 to the barrel lens 203, expanded into parallel light to enter the reflector 202, and then reflected by the reflector 202 again and irradiated on the frozen sample 8 by the objective lens 201. The fluorescent marker on the frozen sample 8 emits fluorescence (with long wavelength) after being excited. The fluorescence is collected and received by the objective lens 201 and becomes parallel light, which is reflected by the reflector 202 to the barrel lens 203, collected by the dichroic mirror 204, filtered by the optical filter 205 and focused on the image detector 206 to form an image of the structure marked by the fluorescent marker in the frozen sample 8. The fluorescence imaging system in the system may also be in a wide-field imaging mode, a laser confocal imaging mode, a structured light illumination imaging mode and other different imaging modes, and these imaging modes are within the protection scope of the present application and can be determined according to experimental needs.

Further, referring to FIG. 3, the base 210 is also provided with a linear translation stage 211, and the linear translation stage 211 is provided with an objective lens adjusting device and a reflector adjusting device, where the objective lens 201 is arranged on the objective lens adjusting device, which is configured for driving the objective lens 201 to move or rotate in three dimensions, and the reflector 202 is arranged on the reflector adjusting device, which is configured for driving the reflector 202 to move or rotate in a plane. In this example, the linear translation stage 211 is suitable for moving in a single direction, and can drive the objective lens adjusting device, the objective lens 201, the reflector adjusting device and the reflector 202 to move away from or close to the frozen sample 8 during operation. When the frozen sample 8 needs to be subjected to ion beam cross sectioning under the real-time monitoring of the fluorescence imaging system 2, the linear translation stage 211 is controlled to actuate and drive the objective lens 201 and the reflector 202 to move to a position where the frozen sample 8 is located. The position of the objective lens 201 is then adjusted by the objective lens adjusting device, so that the objective lens 201 is located on the optical path of the fluorescence emitted by the frozen sample 8, and the reflector 202 is correspondingly adjusted to ensure that the optical path of the fluorescence does not change. When the ion beam cross sectioning of the frozen sample 8 is completed under the real-time monitoring of the fluorescence imaging system 2, the linear translation stage 211 is controlled to start, and the objective lens 201 and the reflector 202 are driven to move away from the frozen sample 8, so as to facilitate other operations such as cryo-transfer and imaging of the frozen sample 8.

Specifically, in this example, the objective lens adjusting device includes an objective lens translation stage 212 and an objective lens rotary stage 213, where the objective lens translation stage 212 is arranged on the objective lens rotary stage 213, and the objective lens rotary stage 213 is arranged on the linear translation stage 211. When the objective lens translation stage 212 is in operation, it can drive the objective lens 201 to move in the horizontal or height direction. The objective lens rotary stage 213 can drive the objective lens 201 to rotate around the frozen sample 8 when in operation. By jointly adjusting the objective translation stage 212 and the objective lens rotary stage 213, the objective lens 201 is aligned with a position for ion beam cross sectioning the frozen sample 8, achieving image focusing. The reflector adjusting device includes a reflector translation stage 214 and a reflector rotary stage 215, where the reflector 202 is arranged on the reflector rotary stage 215, the reflector translation stage 214 is arranged on the linear translation stage 211, the reflector rotary stage 215 can drive the reflector 202 to rotate during operation, and the reflector translation stage 214 can drive the reflector 202 to adjust its position in the horizontal direction during operation. In specific operation, the reflector translation stage 214 and the reflector rotary stage 215 drive the reflector 202 to adjust accordingly based on the adjustment of the objective lens 201, so that the excitation light can accurately focus on the frozen sample 8, and at the same time, the fluorescence emitted by the fluorescent marker on the frozen sample 8 is accurately reflected to the imaging optical path after being converged by the objective lens 201.

Further, referring to FIG. 1 and FIG. 2, the vacuum chamber 1 is further provided with an electron beam system 5, which is configured for electron beam imaging the frozen sample 8. The electron beam system 5 is vertically arranged at a top portion of the vacuum chamber 1, and the ion beam system 6 is obliquely arranged relative to the electron beam system 5, so that the electron beam emitted by the electron beam system 5 and the ion beam emitted by the ion beam system 6 can focus and intersect at one point, and the frozen sample 8 is located at the intersection point. Further, the cryo stage 3 in this example is arranged on the position adjusting device 4, which is suitable for driving the cryo stage 3 and the frozen sample 8 arranged on the cryo stage 3 to move and/or rotate. In specific operation, the position adjusting device 4 drives the frozen sample 8 to move in such a way that the frozen sample 8 is located at the intersection point of the electron beam and the ion beam, and then the position adjusting device 4 is controlled to start and drive the frozen sample 8 to rotate until a certain angle, usually 10° to 20°, is formed between the frozen sample 8 and the ion beam emitted by the ion beam system 6, which is convenient for the ion beam processing.

Figure 4:
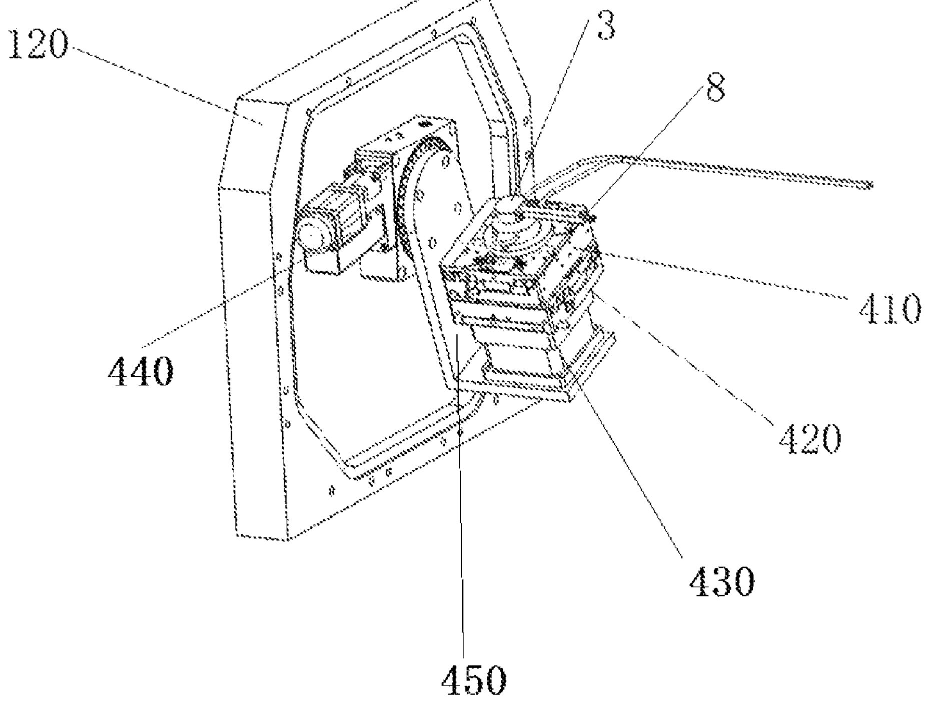
FIG. 4 is a schematic structural view of a cryo stage and a position adjusting device according to Example 1 in a specific embodiment.
Figure 5:
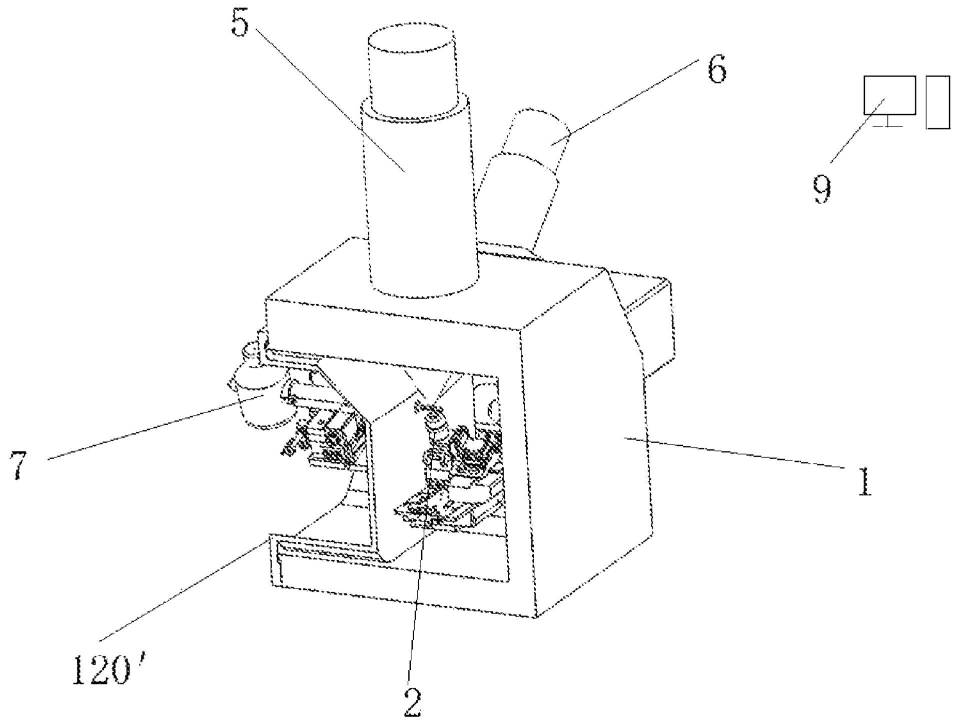
FIG. 5 is a schematic structural view of a real-time fluorescence monitoring cryo-focused ion beam processing device according to Example 2 in a specific embodiment.
Figure 6:
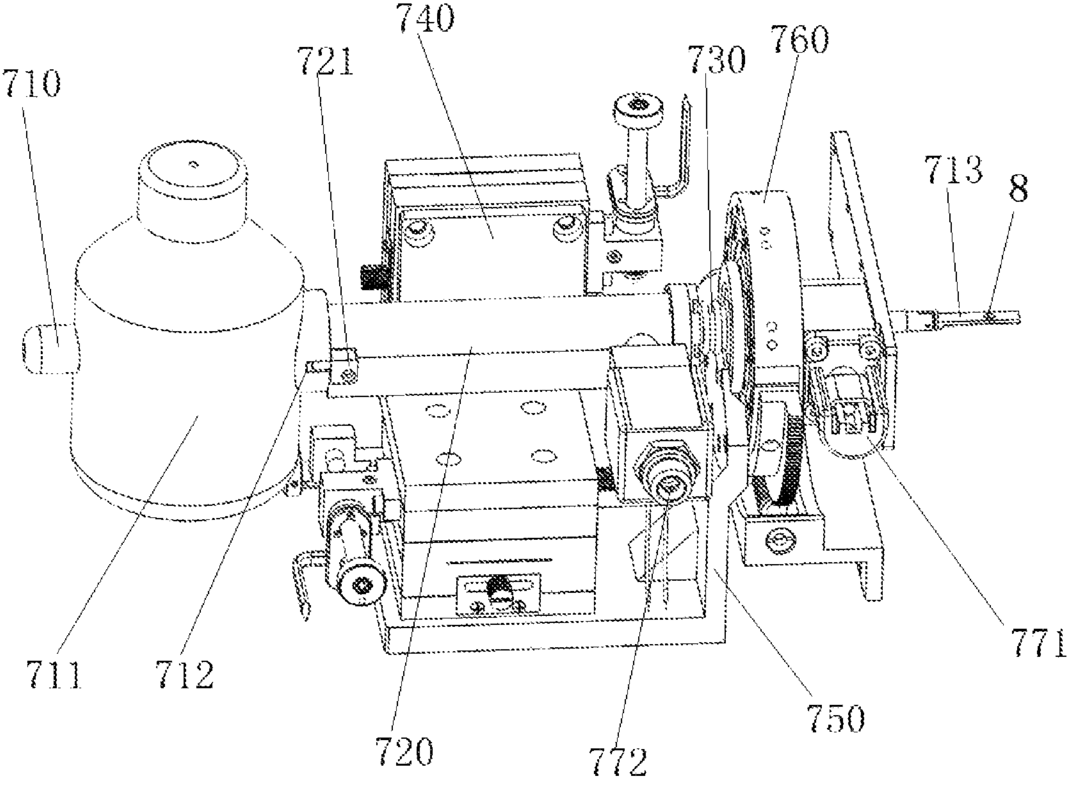
FIG. 6 is a schematic structural view of a cryo-transfer device and a cryo stage according to Example 2 in a specific embodiment.

Specifically, referring to FIG. 4, the position adjusting device 4 in this example includes a first sample translation stage 410, a second sample translation stage 420, a sample lifting stage 430 and a sample rotary stage 440. The cryo stage 3 is arranged on the first sample translation stage 410, the first sample translation stage 410 is arranged above the second sample translation stage 420, the second sample translation stage 420 is arranged above the sample lifting stage 430, the sample lifting stage 430 is arranged on the L-shaped bracket 450, which is connected to the sample rotary stage 440, and the sample rotary stage 440 is fixed on the vacuum chamber door 120, which is hermetically connected to the vacuum chamber 1. Moving directions of the first sample translation stage 410, the second sample translation stage 420 and the sample lifting stage 430 are perpendicular to each other, in which case the cryo stage 3 can be driven to adjust its position in three mutually perpendicular directions in space, so as to accurately adjust the position of the frozen sample 8, so that the frozen sample 8 is located at the intersection point of the electron beam and the ion beam. When the sample rotary stage 440 is in operation, it can drive the L-shaped bracket 450, the sample lifting stage 430, the second sample translation stage 420, the first sample translation stage 410 and the cryo stage 3 to rotate synchronously, so that a certain angle can be formed between the frozen sample 8 arranged on the cryo stage 3 and the ion beam emitted by the ion beam system 6 or the electron beam emitted by the electron beam system 5. When the angle formed between the frozen sample 8 and the ion beam emitted by the ion beam system 6 is ranged from 10° to 20°, the frozen sample 8 can be processed by the ion beam. When the frozen sample 8 is oriented perpendicular to the electron beam emitted by electron beam system 5, the electron beam imaging for the frozen sample 8 can be achieved to meet the use requirements of different scenes.

Further, a controller 9 is also provided. The controller 9 is in connection communication with the linear translation stage 211, the objective translation stage 212, the reflector translation stage 214, the first sample translation stage 410 and the second sample translation stage 420, and is configured for controlling the start and stop of the above devices and adjusting their moving distance. The controller 9 is also in communication connection with the objective lens rotary stage 213, the mirror rotary stage 215 and the sample rotary stage 440, and is configured for controlling the start and stop of the above devices and adjusting their rotation angle. The controller 9 is further in communication connection with the laser 207 and the image detector 206, and is used for controlling the emission and stop of the excitation light and controlling the image detector 206 to receive fluorescence images and signals in real time. The controller 9 controls the start and stop of the devices connected therewith, which realizes the automatic or semi-automatic adjustment of the optical path of the real-time fluorescence system and the real-time receiving of the fluorescence image. This enhances the automation degree of the real-time fluorescence monitoring cryo-focused ion beam processing device, making it convenient and fast.

Based on the real-time fluorescence monitoring cryo-focused ion beam processing device in this example, it is possible to perform the ion beam processing and the electron beam imaging on the frozen sample 8.

The ion beam processing method for real-time fluorescence monitoring the frozen sample includes the following steps:

1) transferring the frozen sample 8 to the cryo stage 3;
2) accurately controlling the start of the position adjusting device 4, adjusting the position of the frozen sample 8 to the ion beam system 6, and placing the frozen sample in the vision field of the ion beam, so that the included angle between the frozen sample and the ion beam is ranged from 10° to 20°;
3) controlling the linear translation stage 211 to start and drive the objective lens 201 and the reflector 202 to move to the position where the frozen sample 8 is located;
4) accurately adjusting the objective translation stage 212, the objective lens rotary stage 213, the reflector translation stage 214 and the reflector rotary stage 215, so that the objective lens 201 faces the frozen sample 8 and realizes image focusing, and a clear image of the fluorescent labeled structure in the frozen sample 8 can be presented by the image detector 206;
5) judging whether there is a structure to be processed in the frozen sample 8 by using the ion beam system 6 and the fluorescence imaging system 2 together, and if so, confirming the specific processing position by analyzing the fluorescence image, setting the processing parameters of the ion beam system 6 to cross section the frozen sample 8, and monitoring the processing position and progress in real time in a continuous or intermittent way while ion beam processing the frozen sample 8, until a lamellae with a thickness of 200 nm is obtained, and reserving the target structure carried with the fluorescence signals;

Electron beam imaging of the frozen sample includes the following steps:

1) controlling the linear translation stage 211 to start and drive the objective lens 201 and the reflector 202 to move away from the frozen sample 8;
2) controlling the position adjusting device 4 to start, adjusting the frozen sample 8 to rotate to a position perpendicular to the electron beam emitted by the electron beam system 5, and performing electron beam imaging on the frozen sample 8.

Example 2

Based on Example 1, the real-time fluorescence monitoring cryo-focused ion beam processing device provided according to this example is different only in the structure of the vacuum chamber door 120', the structure of the cryo stage 3 and the cooling form compared to Example 1.

Referring to FIG. 5 to FIG. 10, the vacuum chamber door 120' in this example has a concave structure and is provided with a sample transfer port 121'. The cryo stage 3 is an end of the cryo-transfer device 7, which includes a frozen sample transfer holder 710, a sample transfer tube 720, a bellows assembly 730, a cryo transfer three-dimensional translation stage 740 and an angle adjusting device 760. The sample transfer tube 720 is hermetically connect to the sample transfer port 121' through the bellows assembly 730. An end of the frozen sample transfer holder 710 is a frozen sample fixing end 713 for fixing the frozen sample 8, and other end is provided with a Dewar 711. The frozen sample fixing end 713 passes through the sample transfer tube 720 and the bellows assembly 730, an outer periphery of the frozen sample transfer holder 710 is slidably and hermetically connected with an inner wall of the sample transfer tube 720, the frozen sample transfer holder 710 slides along the inner wall of the sample transfer tube 720, and the frozen sample fixing end 713 passes through the sample transfer port 121' to transfer the frozen sample 8 into the vacuum chamber 1. Dewar 711 is used to provide a cryogenic source for the frozen sample 8 through a way of heat conduction, so that frozen sample 8 is always in a glassy frozen form. The frozen sample transfer holder 710 can be used as a transfer device, and the frozen sample fixing end 713 can also be used as the cryo stage 3, which greatly simplifies the structure of the real-time fluorescence monitoring cryo-focused ion beam processing device.

Further, a clamping slot 712 is arranged at a side, where the Dewar 711 is located, of the frozen sample transfer holder 710, and a clamping pin 721 is correspondingly arranged on the sample transfer tube 720. When the clamping pin 721 is clamped into the clamping slot 712, the frozen sample transfer holder 710 is clamped with the sample transfer tube 720, and when the clamping pin 721 is pulled out of the clamping slot 712, the frozen sample transfer holder 710 is disconnected from the sample transfer tube 720. The cryo transfer three-dimensional translation stage 740 is arranged on a cryo transfer three-dimensional translation stage bracket 750 and connected with the sample transfer tube 720. The bellows assembly 730 is configured for telescopic adjustment. When the frozen sample transfer holder 710 is clamped with the sample transfer tube 720, the cryo transfer three-dimensional translation stage 740 can drive the bellows assembly 730 connected with the sample transfer tube 720 to expand and contract correspondingly, and the position of the sample transfer tube 720 relative to the vacuum chamber 1 changes, so that the position of the frozen sample 8 located at the frozen sample fixing end 713 also changes. In this example, the cryo transfer three-axis translation stage 740 is used to accurately adjust the position of the frozen sample 8, enabling that the frozen sample 8 is located at the focus point of the ion beam emitted by the ion beam system 6 and the electron beam emitted by the electron beam system 5.

Figure 7:
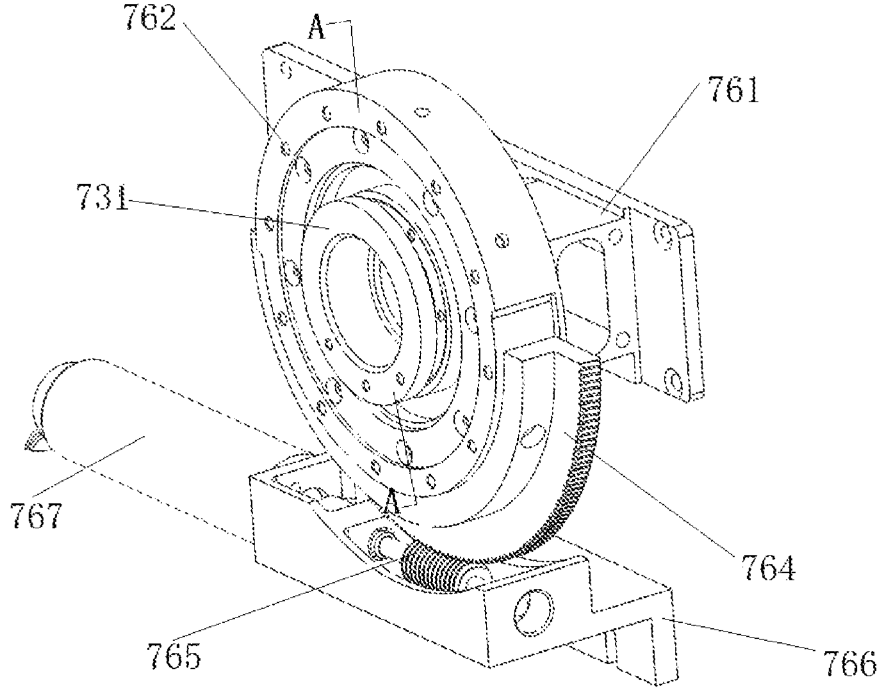
FIG. 7 is a structural schematic view of an angle adjusting device according to Example 2 in a specific embodiment.
Figure 8:
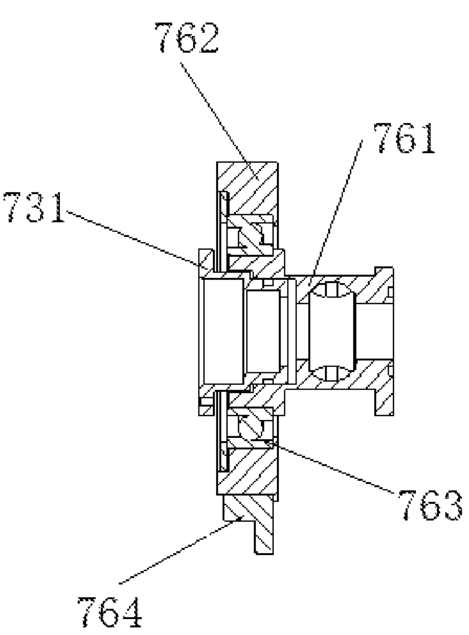
FIG. 8 is a cross-sectional view taken along a line A-A in FIG. 7.
Figure 9:
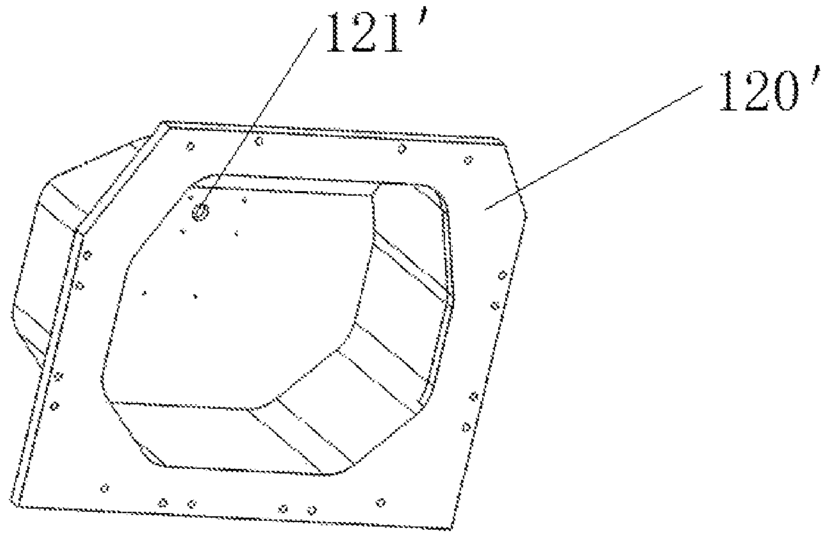
FIG. 9 is a schematic structural view of a vacuum chamber door according to Example 2 in a specific embodiment.

Specifically, referring to FIG. 7, the angle adjusting device 760 includes a sleeve vacuum plate valve housing assembly 761, a shaft disc 762, a worm wheel 764 and a worm 765. An end of the sleeve vacuum plate valve housing assembly 761 is hermetically connected to the sample transfer port 121' and sleeved on an outer periphery of the bellows assembly 730. An inner wall of the sleeve vacuum plate valve housing assembly 761 is in dynamic sealing connection with the outer periphery of the bellows assembly 730. The bellows assembly 730 is fixedly connected with the cryo transfer three-dimensional translation stage bracket 750 through a bolt, and the worm wheel 764 is fixed on the shaft disc 762 through the bolt. The shaft disc 762 is rotatably sleeved on the outer periphery of the sleeve vacuum plate valve housing assembly 761 through a shaft disc bearing 763, and is fixedly connected with the cryo transfer three-dimensional translation stage bracket 750 through the bolt. Both ends of the worm 765 are rotatably connected to a worm bracket 766 through a bearing, and the worm bracket 766 is arranged on the vacuum chamber door 120' through the bolt. The worm 765 is mesh with the worm wheel 764, and an end of the worm 765 is connected with a motor 767, which can drive the worm 765 and the worm wheel 764 to be in a meshed transmission. When the angle adjustment is required, it is confirmed that the frozen sample transfer holder 710 is clamped with the sample transfer tube 720. The motor 767 is controlled to start and drive the worm 765 and the worm wheel 764 in meshed transmission, consequently driving the shaft disc 762, the cryo transfer three-axis translation stage bracket 750, the sample transfer tube 720, the bellows assembly 730, the frozen sample transfer holder 710 and the frozen sample 8 to rotate synchronously to position the frozen sample 8 at an included angle of 10° to 20° relative to the ion beam emitted by the ion beam system 6, or perpendicular to the electron beam emitted by the electron beam system 5, thus fulfilling the requirements of ion beam processing or electron beam imaging of the frozen sample 8.

Figure 10:
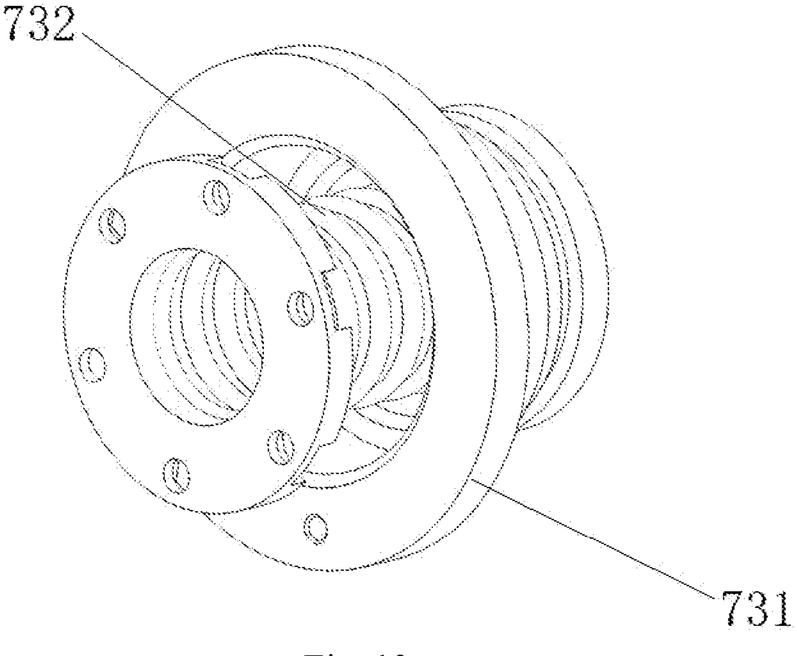
FIG. 10 is a schematic structural view of a bellow assembly according to Example 2 in a specific embodiment.

In this example, referring to FIG. 10, the bellows assembly 730 includes a bellows 732 and a synchronous sleeve 731. The synchronous sleeve 731 is sleeved on an outer periphery of the bellows 732 and placed in the sleeve vacuum plate valve housing assembly 761, and an outer periphery of the synchronous sleeve 731 is in dynamic sealing connection with an inner wall of the sleeve vacuum plate valve housing assembly 761. Further, an end of the synchronous sleeve 731 is fixedly connected with the end of the bellows 732 by welding, and the other end is detachably connected with the cryo transfer three-dimensional translation stage bracket 750 by the bolt. During the rotation, the cryo transfer three-dimensional translation stage bracket 750 drives the synchronous sleeve 731 and the bellows 732 to rotate synchronously.

Further, a vacuum transfer system 770 is also provided, which is used to drive the frozen sample transfer holder 710 to slide along the sample transfer tube 720 based on a working principle of negative pressure, and to convey the frozen sample 8 from the atmospheric environment to the high vacuum environment. Specifically, the vacuum transfer system 770 includes a vacuum plate valve 771 and a pre-pumping valve 772. The vacuum plate valve 771 is hermetically connected to the sleeve vacuum plate valve housing assembly 761 to form a sealed passage between the frozen sample transfer holder 710, the sample transfer tube 720, the bellows 732, the sleeve vacuum plate valve housing assembly 761 and the vacuum plate valve 771. The vacuum plate valve 771 is used to control the communication and close of the sealed passage with the vacuum chamber 1. The pre-pumping valve 772 is hermetically connected to the sample transfer tube 720, and is closely connected with the sealed passage for vacuumizing the sealed passage.

In specific operation, the frozen sample 8 is fixed on the frozen sample transfer holder 710 in advance, the vacuum plate valve 771 is kept closed, the frozen sample fixing end 731 is inserted into the sample transfer tube 720, and then the pre-pumping valve 772 is controlled to open to vacuumize the sealed passage by the vacuum pump. When the set value is reached, the pre-pumping valve 772 is controlled to close and the vacuum plate valve 771 is controlled to open. Since the vacuum degree of the vacuum chamber 1 is lower than the external atmospheric pressure, the frozen sample transfer holder 710 can be manually controlled to slide along the sample transfer tube 720 under the negative pressure, so as to transfer the frozen sample 8 into the vacuum chamber 1. In this example, the transfer process of the frozen sample 8 is simple, convenient and fast. Then, the cryo transfer three-dimensional translation stage 740 is controlled to start, and the frozen sample 8 is adjusted to be positioned at the intersection point of the ion beam emitted by the ion beam system 6 and the electron beam emitted by the electron beam system 5. When the electron beam imaging is required, the angle adjusting device 760 is controlled to start, and the frozen sample 8 is adjusted to be perpendicular to the electron beam emitted by the electron beam system 5, so as to meet the electron beam imaging requirements of the frozen sample 8. When the ion beam processing is required, the angle adjusting device 760 is controlled to start, and the included angle between the frozen sample 8 and the ion beam emitted by the ion beam system 6 is adjusted to 10° to 20°, so as to fulfill the ion beam processing requirements of the frozen sample 8.

Specifically, in this example, the controller 9 is in communication connection with the vacuum plate valve 771 and the pre-pumping valve 772, and the opening and closing of the vacuum plate valve 771 and the pre-pumping valve 772 are controlled by the controller 9, so as to realize the vacuum transfer of the frozen sample 8. Further, the controller 9 is also in communication connection with the cryo transfer three-dimensional translation stage 740 and the angle adjusting device 760, and the controller 9 is used for controlling the start, movement distance and rotation angle adjustment of the cryo transfer three-dimensional translation stage 740, so as to achieve the purpose of accurately adjusting the position of the frozen sample 8 to meet the use requirements in different scenarios. In this example, the automatic control of the real-time fluorescence monitoring cryo-focused ion beam processing device is achieved by the controller 9, which improves the automation degree of the device, making the device convenient and fast.

Based on the real-time fluorescence monitoring cryo-focused ion beam processing device in this example, it is possible to perform the ion beam processing and the electron beam imaging on the frozen sample 8.

A method for ion beam processing the frozen sample 8 includes the follow steps:

1) placing the frozen sample 8 on the frozen sample fixing end 713 of the frozen sample transfer holder 710, and transferring the frozen sample 8 into the vacuum chamber 1 through the frozen sample transfer holder 710;
2) accurately controlling the start of the cryo transfer three-dimensional translation stage 740 and the angle adjusting device 760, adjusting the position of the frozen sample 8 relative to the ion beam system 6, and placing the frozen sample in the field of the ion beam, enabling the included angle between the frozen sample and the ion beam ranging from 10° to 20°;
3) controlling the linear translation stage 211 to start and drive the objective lens 201 and the reflector 202 to move to the position where the frozen sample 8 is located;
4) accurately adjusting the objective translation stage 212, the objective lens rotary stage 213, the reflector translation stage 214 and the reflector rotary stage 215, so that the objective lens 201 faces the frozen sample 8 and realizes image focusing, and a clear image of the fluorescent labeled structure in the frozen sample 8 can be presented by the image detector 206;
5) judging whether there is a structure to be processed in the frozen sample 8 by using the ion beam system 6 and the fluorescence imaging system 2 together, and if so, confirming the specific processing position by analyzing the fluorescence image, setting the processing parameters of the ion beam system 6 to cross section the frozen sample 8, and monitoring the processing position and progress in real time in a continuous or intermittent way while ion beam processing the frozen sample 8, until a lamellae with a thickness of 200 nm is obtained, and reserving the target structure carried with the fluorescence signals.

Electron beam imaging of the frozen sample includes the following steps:

1) controlling the linear translation stage 211 to start and drive the objective lens 201 and the reflector 202 to move away from the frozen sample 8;
2) controlling the position adjusting device 4 to start, adjusting the frozen sample 8 to rotate to a position perpendicular to the electron beam emitted by the electron beam system 5, and performing electron beam imaging on the frozen sample 8.

The real-time fluorescence monitoring cryo-focused ion beam processing device provided according to Example 1 and Example 2 realizes in-situ real-time fluorescence monitoring of the frozen sample 8 by setting the fluorescence imaging system 2 and the ion beam system 6. The real-time ion beam processing is accurate in positioning, and in the process of fluorescence positioning monitoring, the ion beam processing does not need to stop, with high speed and high flux, which greatly improves the working efficiency and accuracy of ion beam processing. The device can also realize multiple functions such as electron beam-fluorescence combined imaging, ion beam-fluorescence combined imaging and electron beam-ion beam-fluorescence combined imaging. The cryo stage 3 can also be replaced with different sample holders or stages as required, which is flexible and convenient to use. The vacuum chamber door 120 and the vacuum chamber door 120' can be adapted to different types of cryo dual-beam SEMs by changing their sizes, and have strong universality.

In summary, the real-time fluorescence monitoring cryo-focused ion beam processing device provided according to the present application is only a better specific embodiment of the present application, but the protection scope of the present invention is not limited to this. Within the technical scope revealed by the present application, all those skilled in the art can make equivalent variations and modifications according to the technical solutions and invention design of the present application.

The invention claimed is:

1. A real-time fluorescence monitoring cryo-focused ion beam processing device, comprising:

a vacuum chamber, wherein the vacuum chamber is internally provided with a cryo stage for storing a frozen sample, and a fluorescent marker is arranged in the frozen sample;

an ion beam system, wherein the ion beam system is arranged on the vacuum chamber and directed to the frozen sample, so as to perform an ion beam processing on the frozen sample; and a fluorescence imaging system, wherein the fluorescence imaging system is arranged on the vacuum chamber and below the frozen sample, so as to emit excitation light to the frozen sample and perform real-time optical imaging, wherein the fluorescence imaging system comprises a laser, an objective lens, a reflector, a barrel lens, a dichroic mirror, an optical filter and an image detector which are sequentially arranged along an optical path;

the vacuum chamber is provided with an optical window, and a vacuum flange is hermetically connected to the optical window;

one end of the vacuum flange is connected with an optical connection tube, and the other end is connected with a base, the optical connection tube is located outside the vacuum chamber, and the base is located inside the vacuum chamber;

the objective lens and the reflector are both arranged on the base;

the barrel lens, the dichroic mirror and the optical filter are all arranged in the optical connection tube, and the image detector is arranged at a the side, away from the vacuum flange, of the optical connection tube;

the vacuum flange is centrally provided with a light-transmitting piece, and the light-transmitting piece is configured for sealing the vacuum chamber; and the laser is arranged on a branch of a tube wall of the optical connection tube, and the laser is located on a side where the dichroic mirror is perpendicular to the optical filter.

2. The real-time fluorescence monitoring cryo-focused ion beam processing device according to claim 1, wherein a linear translation stage is arranged on the base; and the objective lens and the reflector are both arranged on the linear translation stage, and the objective lens and the reflector is driven by the linear translation stage to move towards and/or away from the frozen sample.

3. The real-time fluorescence monitoring cryo-focused ion beam processing device according to claim 2, wherein the linear translation stage is further provided with an objective lens adjusting device and a reflector adjusting device;

the objective lens is arranged on the objective lens adjusting device, and the objective lens adjusting device is configured for driving the objective lens to move and/or rotate in three dimensions; and the reflector is arranged on the reflector adjusting device, and the reflector adjusting device is configured for driving the reflector to move and/or rotate in a plane.

4. The real-time fluorescence monitoring cryo-focused ion beam processing device according to claim 3, wherein the objective adjusting device comprises an objective lens rotary stage and an objective translating stage; and the objective lens is arranged on the objective lens translation stage, the objective lens translation stage is arranged on the objective lens rotary stage, and the objective lens rotary stage is arranged on the linear translation stage, wherein the objective lens is driven by the objective lens translation stage to move in three dimensions, and is driven by the objective lens rotary stage to rotate.

5. The real-time fluorescence monitoring cryo-focused ion beam processing device according to claim 3, wherein the reflector adjusting device comprises a reflector translation stage and a reflector rotary stage; and the reflector is arranged on the reflector rotary stage, the reflector rotary stage is arranged on the reflector translation stage, and the reflector translation stage is arranged on the linear translation stage, the reflector is driven by the reflector rotary stage to rotate, and is driven by the reflector translation stage to move in the plane.

6. The real-time fluorescence monitoring cryo-focused ion beam processing device according to claim 1, wherein the vacuum chamber is further provided with an electron beam system for electron beam imaging the frozen sample; and the electron beam system is obliquely arranged relative to the ion beam system, and the electron beam emitted by the electron beam system and the focused ion beam emitted by the ion beam system is intersected at one point, and the frozen sample is located at the intersection point.

7. The real-time fluorescence monitoring cryo-focused ion beam processing device according to claim 6, wherein the cryo stage is arranged on a position adjusting device, and the position adjusting device is configured for driving the cryo stage to perform position adjustment, wherein the position adjusting device comprises:

a first sample translation stage, on which the cryo stage is arranged;

a second sample translation stage, which is arranged below the first sample translation stage, a sample lifting stage, which is arranged below the second sample translation stage; and a sample rotary stage, which is arranged on a vacuum chamber door and connected with the sample lifting stage through an L-shaped bracket, wherein the L-shaped bracket, the sample lifting stage, the second sample translation stage, the first sample translation stage and the cryo stage are driven by the sample rotary stage to rotate synchronously.

8. The real-time fluorescence monitoring cryo-focused ion beam processing device according to claim 6, wherein the cryo stage is an end of the cryo-transfer device, and the cryo-transfer device comprises:

a sample transfer tube, wherein a side of the vacuum chamber door is provided with a sample transfer port, and the sample transfer tube is flexibly connected to the sample transfer port through a bellows assembly;

a frozen sample transfer holder, an end of which is provided with a Dewar and the other end of which is a frozen sample fixing end;

wherein the frozen sample fixing end passes through the sample transfer tube, and an outer periphery of the fixing end is connected with an inner wall of the sample transfer tube in a dynamic sealing way, and the frozen sample fixing end passes through the sample transfer port to transfer the frozen sample into the vacuum chamber;

an end, where the Dewar is located, is clamped and/or decoupled from the sample transfer tube; and a cryo transfer three-dimensional translation stage, which is connected with the sample transfer tube, and when the frozen sample transfer holder is clamped with the sample transfer tube, the frozen sample transfer holder clamped with the sample transfer tube is driven to move in three dimensions.

9. The real-time fluorescence monitoring cryo-focused ion beam processing device according to claim 8, wherein the cryo-transfer device further comprises an angle adjusting device, and the angle adjusting device comprises:

a sleeve vacuum plate valve housing assembly, wherein one end of which is hermetically connected to the cryo transfer port and the other end of which is hermetically connected to the bellows assembly, one end of the bellows assembly is hermetically connected to the sample transfer tube and the other end of the bellows assembly is fixedly connected to a cryo transfer three-axis translation stage bracket;

a worm wheel, which is arranged on the shaft disc, wherein the shaft disc is rotatably sleeved on an outer periphery of the sleeve vacuum plate valve housing assembly, and the shaft disc is fixedly connected with the cryo transfer three-dimensional translation stage bracket; and a worm, wherein an end of which is rotatably connected to a worm bracket, the worm bracket is arranged on the vacuum chamber door, and one end of the worm is connected with a motor and engaged with the worm wheel, wherein when the frozen sample transfer holder is clamped with the sample transfer tube, the motor drives the worm wheel engaged with the worm to rotate, so as to drive the shaft disc, the cryo transfer three-dimensional translation stage, the sample transfer tube, the bellows assembly and the frozen sample transfer holder to rotate synchronously, so as to adjust the frozen sample between the electron beam system and/or the ion beam system.

10. A real-time fluorescence monitoring cryo-focused ion beam processing method, wherein the method is performed on the real-time fluorescence monitoring cryo-focused ion beam processing device according to claim 1, and the method comprises:

transferring the frozen sample to the vacuum chamber and placing the frozen sample on the cryo stage;

controlling the fluorescence imaging system to start, wherein excitation light is emitted from the laser, the excitation light is reflected by the dichroic mirror to the tube lens to be expanded into first parallel light, the first parallel light is reflected by the reflector and then irradiated on the frozen sample through the objective lens; and wherein the fluorescent marker emits fluorescence after being excited by the first parallel light, the fluorescence is received and collected by the objective lens to become second parallel light, the second parallel light is reflected by the reflector to the tube lens and then collected, collected light is through the dichroic mirror and then is filtered by the optical filter, and finally filtered light is focused on the image detector to create a real-time image of the frozen sample; and controlling the ion beam system to start, performing ion beam processing on the frozen sample, and monitoring the processing of the frozen sample in real time through the fluorescence imaging system.

* * * * *